United States Patent [19]

Vogelgesang et al.

[11] Patent Number: 5,342,682
[45] Date of Patent: Aug. 30, 1994

[54] METHOD OF MOLDING OPTICAL RECORDING DRUMS

[75] Inventors: Peter J. Vogelgesang, Roseville; Wayne M. Wirth, North St. Paul, both of Minn.

[73] Assignee: Minnesota Mining and Manufacturing Company, St. Paul, Minn.

[21] Appl. No.: 781,924

[22] Filed: Oct. 24, 1991

Related U.S. Application Data

[62] Division of Ser. No. 583,668, Sep. 17, 1990, Pat. No. 5,096,627.

[51] Int. Cl.5 .............................................. B32B 18/00
[52] U.S. Cl. .................................... 428/325; 360/136; 364/248; 365/173; 365/215; 428/406; 428/407; 428/694 ML
[58] Field of Search ............... 428/325, 406, 407, 426, 428/900, 413, 34.7, 36.9, 36.91, 307.3, 64, 36.5, 694 R, 694 ST, 694 SL, 694 ML, 692; 360/136; 365/33, 50, 122, 173, 215, 221; 364/248, 248.3; 346/132; 369/283, 288

[56] References Cited

U.S. PATENT DOCUMENTS

| | | | |
|---|---|---|---|
| 3,267,484 | 6/1962 | Roedder | 360/136 |
| 3,365,351 | 1/1968 | Maaz et al. | 264/45 |
| 3,383,662 | 5/1968 | Spieker et al. | 340/173 |
| 3,408,634 | 10/1968 | Lee et al. | 340/173 |
| 3,440,119 | 4/1969 | Spieker | 156/99 |
| 3,500,343 | 3/1970 | Spieker | 340/173 |
| 3,691,263 | 9/1972 | Stoy et al. | 264/1 |
| 3,846,366 | 11/1974 | Wallace | 523/129 |
| 4,144,372 | 3/1979 | Beck | 428/283 |
| 4,267,247 | 5/1981 | Ziolo et al. | 430/120 |
| 4,416,837 | 11/1983 | Neefe | 264/2.1 |
| 4,534,915 | 8/1985 | Neefe | 264/1.4 |
| 4,576,896 | 3/1986 | Suzuki et al. | 430/271 |
| 4,612,244 | 9/1986 | Kaneda et al. | 428/323 |
| 4,633,357 | 12/1986 | Kinjo | 360/136 |
| 4,637,791 | 1/1987 | Neefe | 425/425 |
| 4,659,522 | 4/1987 | Neefe | 264/2.1 |
| 4,673,602 | 6/1987 | Nakayama et al. | 428/65 |
| 4,710,424 | 12/1987 | Bandara et al. | 428/325 |

FOREIGN PATENT DOCUMENTS

| | | |
|---|---|---|
| 0360144 | 3/1990 | European Pat. Off. . |
| 21722 | 1/1987 | Japan ............... C03B 20/00 |
| 1234434 | 9/1989 | Japan . |
| 97221 | 2/1961 | Netherlands . |

OTHER PUBLICATIONS

European Search Report.

Primary Examiner—Paul J. Thibodeau
Assistant Examiner—R. Follett
Attorney, Agent, or Firm—Gary L. Griswold; Walter N. Kirn; Charles D. Levine

[57] ABSTRACT

A method for fabricating in a mold a rotatable recording drum is disclosed. Initially, the mold is rotated and a predetermined quantity of a flowable substance is poured into the mold cavity and is centrifugally flung against the mold wall to form a mold layer with a smooth inner surface. Next, a surface substance is poured into the mold cavity and is allowed to harden against the mold layer. A core outer layer substance is then poured into the mold cavity and allowed to harden against the surface substance, and rotation of the mold is stopped. The mold layer fluid is removed, and the cavity inside the outer layer is filled with a core inner layer substance which is allowed to harden before the drum core is removed from the mold cavity. Following removal of the core from the mold cavity, the hardened surface substance may be vacuum coated, and a protective overcoat applied to the core. The drum core and the surface substance can also be formed separately.

2 Claims, 4 Drawing Sheets

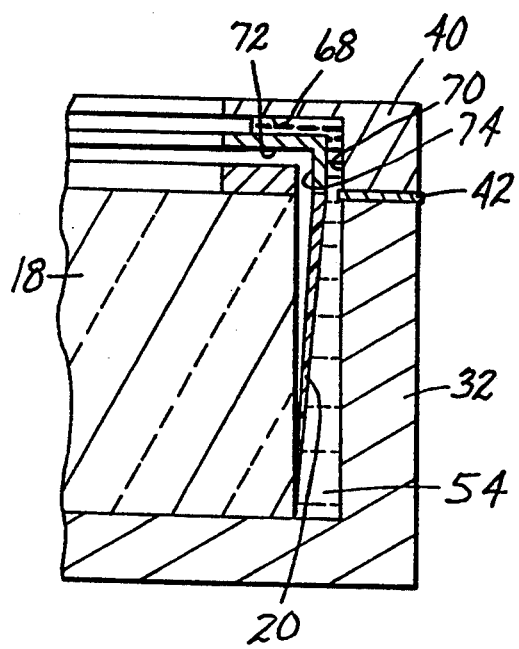
Fig. 6A
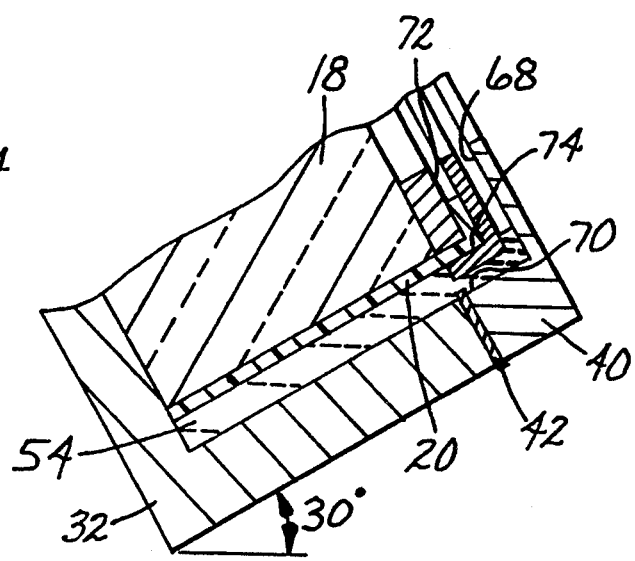
Fig. 6B
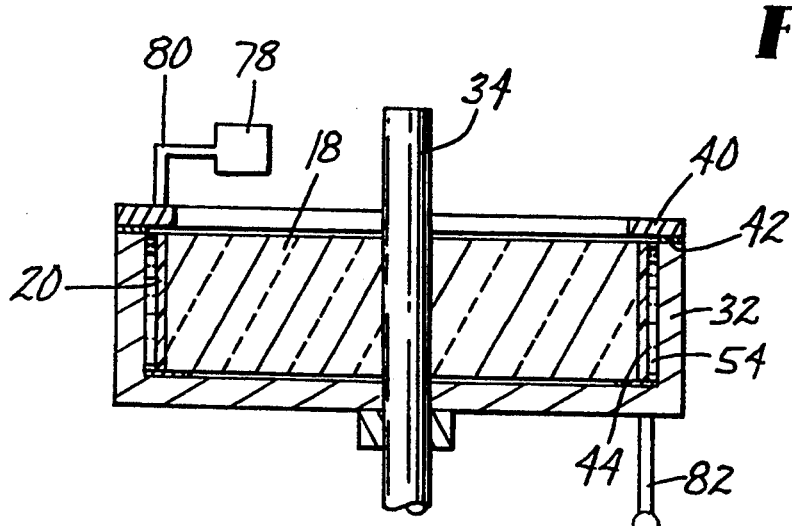
Fig. 7
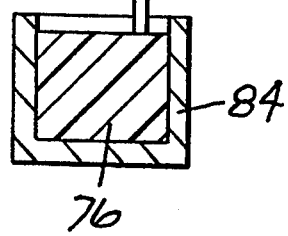

METHOD OF MOLDING OPTICAL RECORDING DRUMS

This is a division of application Ser. No. 07/583,668 filed Sep. 17, 1990, now U.S. Pat. No. 5,096,627.

TECHNICAL FIELD

The present invention relates to optical recording drums. More particularly, the present invention relates to methods of spin molding optical recording drums using solid and liquid mold systems.

BACKGROUND OF THE INVENTION

Rotating drums have been used for the storage of data in electronic digital computing systems since the first electronic digital computer built in the 1930's. Although magnetic recording superseded these early drums, the use of rotatable drum memories has persisted. The general configuration of a rotating drum memory is a cylinder which is rotated at a constant speed around its axis. A recording medium, such as a magnetic recording material, is deposited on the drum surface. Data is recorded, usually in bit form, by a recording device located adjacent the rotating drum surface. The data is fed from a data source such as a digital computer, and is recorded in circumferential lines, called data tracks, on the drum surface. To read the data, a reading device is placed over the data track to feed the data back to the computing system as the drum rotates. The time required to find and read a particular item of data on the rotating drum is the access time.

Recording drums are superior to disks in that the surface velocity of a drum is constant over the entire surface whereas with disks the velocity varies with the radius. With disks, the maximum data transfer rate is a function of the innermost ring, and the disk operates at a very low efficiency when at the outermost rings unless the disk speed varies with the changing radius. For example, when the outermost rings are twice as long as the innermost rings, the disk operates at 50% efficiency at the outer rings. Drums operate at a constant velocity and have a higher data transfer rate as they operate at 100% efficiency. Additionally, because the mechanical precision of drums is typically greater than disks, less stringent performance is required of the optical focusing and tracking servos used with optical drums. While the coating of magnetic media and photographic emulsions onto drums is technically and economically feasible, the adaptation of the drum configuration to new recording technology such as optical recording is less feasible.

While the first rotating drum memories used capacitors as the recording medium, and most commercial drum memories use magnetic media, optical memory rotating drums have been disclosed in U.S. Pat. Nos. 3,383,662; 3,408,634; 3,440,119; and 3,500,343. In the optical drum memory disclosed in this group of patents, the outside of a cylinder is coated with a photographic emulsion, and data bits are recorded on the resulting photosensitive surface. Data is read from the cylinder by a microscope and a photodiode. This device provides greater bit density than prior magnetic recording media, and is insensitive to strong magnetic fields. However, this device can only record data photographically; the data must be developed and can not be rewritten. Thus, this device can not interact with associated computers or other digital systems in real time as it is read only.

In optical recording technologies using laser recording, a laser beam is focused to a very small spot to record data onto an optically sensitive coating on a substrate. The substrate is an inert substance on which the optically sensitive layer is coated. The data is immediately readable after recording, without any intermediate processing such as chemical development of latent images. Such recording systems are called direct read after write (DRAW) systems. Such a recording mode is permanent and therefore is not erasable and reusable.

Magneto-optic recording is an erasable, reusable method of laser recording, and uses a tightly focused laser spot to heat an area of magnetic material above its Curie point while subjecting the area to a magnetic field. The size of the recorded data bit is determined by the size of the heated area, and is smaller than the area covered by the magnetic field. Therefore, bit areas much smaller than those achievable with conventional magnetic recording heads can be obtained. The magnetically recorded bits can be read by a laser beam.

Magneto-optic recording can attain bit densities as great as ten times that of rigid disk magnetic media as the data bits have an area on the order of one square micrometer, and the bit and track pitch are of similarly small dimensions. To achieve these levels of resolution, the surface of the recording medium must be extremely smooth, a condition not easily producible in cylindrical form with existing technologies. Moreover, apparatus for locating the data on such a small scale must be extremely precise.

Focusing a beam of light, usually a laser beam, to a sufficiently small spot size to achieve resolution on the order of one micrometer requires the distance from the focusing lens to the recording surface to be held to tolerances of one micrometer. While reading a data track, the recording medium surface inevitably moves in a direction normal to its axis of rotation, thereby changing the lens-to-surface distance. With rotating drums, this surface wandering is expressed as the total distance the surface wanders during one revolution of the drum and is commonly referred to as runout, or total indicated runout (TIR). To compensate for this surface wandering, servo systems maintain focus by adjusting the lens location as the surface wanders. In optical disk recording, surface wandering can be over 100 micrometers, and servo systems can adjust the lens location to a tolerance of less than 1 micrometer at typical rotational speeds. As surface wandering in rotating drum memories is considerably less, a simpler focusing mechanism can be used, while providing greater focus accuracy and higher speeds.

Typical diameters of commercially available rotating drum memories are in the range of 26.7-83.3 cm (10.5-32.8 inches). Maintaining surface wandering to within a few micrometers for these drums requires greater precision than is achievable by conventional manufacturing processes, absent expensive and time-consuming finishing operations. Surface wandering of cylindrical drums is caused by the bearings, the eccentricity of the drum surface, and various surface waves, out-of-roundness, and other defects. Even assuming a stationary drum center, the large drum size contributes to dimensional variations which would lead to surface wandering. Furthermore, the large mass and any vibration-causing unbalance increase surface wandering.

Finally, manufacture is complicated by the high level of smoothness required on the outside of the drum. While techniques for producing smooth surfaces on flat optical recording disks are known, these techniques are not suitable for applying similar surfaces to drums. The smooth flat recording surfaces on optical disk recording media can be achieved by coating a curable polymeric liquid onto a horizontal substrate to form a free surface and allowing the liquid to harden. The coating can be thinned by spinning the horizontal substrate around a vertical axis, before hardening, thereby flinging off excess material by centrifugal force. This coating process, referred to as spin-coating, provides very high quality flat surfaces, but can not coat the outside of a drum, as cylindrical surfaces cannot be made horizontal, and gravity causes sagging and other non-uniformities.

Nonetheless, spinning a liquid layer around a vertical axis can form symmetric curved optical surfaces in a technique known as spin casting. Various aspects of spin casting contact lenses are described in U.S. Pat. Nos. 4,416,837; 4,534,915; 4,637,791 and 4,659,522. In the first patent, a mold is spun and used to spin cast contact lenses. In the second patent, UV light is used to minimize stresses by curing the cast product more rapidly near the center. In the third patent, vibration is reduced during spin casting to prevent surface waves in the lens during curing. The last patent describes spin casting of an annular lens. These patents illustrate that spin casting can form optical quality concave surfaces, and that a spin cast polymeric mold can, in some cases, be used to produce an optical quality convex surface.

However, the lenses produced by spin casting in these patents bear little relation to the optical quality surfaces required in a rotating drum used in laser optical recording. Contact lenses are not right circular cylinders and do not require precise mechanical tolerances of the type required of memory drum components. Moreover, when placed in the eye, contact lenses are covered by liquid layers which coat surface roughness. Optical recording involves no liquid layer and requires a high level of smoothness to prevent the optically sensed signal from being lost in noise generated by roughness.

SUMMARY OF THE INVENTION

The present invention provides an optically smooth, concentric cylindrical surface by providing a layer on the surface of a cylindrical drum which exhibits levels of smoothness normally achieved only by coatings or by complex grinding and polishing procedures. The cylindrical surface eliminates larger scale eccentricities, out-of-roundness, and other sources of surface wandering found in drums produced by conventional volume production methods.

A method for fabricating a rotatable recording drum in a single cylindrical mold rotatable around an axially central mold shaft includes the following steps. First, the mold is rotated around its axis of rotation and a measured, predetermined quantity of a flowable substance is poured into the mold cavity. This substance is centrifugally flung against the mold wall to form a cylindrical mold layer having an interior surface equidistant from the axis of rotation to create a concentric, smooth, circular inner surface. Next, a surface substance having a lower density than the mold layer, such as activated epoxy, is poured into the mold cavity and is allowed to harden against the mold layer.

A drum core first layer substance such as a mixture of glass microspheres and epoxy is then poured into the mold cavity and allowed to harden against the epoxy, and the mold rotation is stopped. The mold layer fluid is removed from the mold cavity, and a metallic sleeve is placed over the mold shaft to serve as a central hole for the drum core. The cavity between the drum core first layer and the metallic sleeve is filled with a drum core second layer substance such as a paste of ceramic spheres and activated epoxy which is also allowed to harden. Finally, the drum core is removed from the mold cavity.

Where the mold axis of rotation is vertical, the axis is slowly shifted while the mold is rotating while containing both the flowable substance and the activated epoxy. The mold is shifted to a horizontal position to remove the wedge shape of the profile between the flowable substance and the epoxy which is caused by the gravitational force. Alternatively, the axis of rotation can remain at a constant 30° angle with the horizontal.

Following removal of the drum core from the mold cavity, the activated epoxy hardened on the drum core may be vacuum coated with a magneto-optic, thin film, metallic layer identical in composition to the layers in magneto-optic recording disks. The drum core is replaced into the mold cavity, and a protective overcoat is applied to the surface of the magneto-optic thin film to protect it and to prevent oxidation of the metals in the thin films. This protective overcoat is applied by rotating the mold around its axis of rotation; pouring a measured, quantity of the flowable substance into the mold cavity to form a mold layer; centrifugally flinging the flowable substance so that its interior surface is equidistant from the axis of rotation to create a concentric, smooth, round inner surface spaced from the outer surface of the drum core; inserting the protective overcoat material into the mold cavity between the outer surface of the epoxy and the inner surface of the mold layer to fill the space therebetween; and allowing the protective overcoat to harden onto the outer surface of the drum core.

Alternatively, the drum core and the surface substance can be formed separately. In forming the core, the mold is first rotated around its axis of rotation and a measured, quantity of a flowable substance is poured into the mold cavity. The flowable substance is centrifugally flung against the mold wall to form a cylindrical mold layer having a concentric, smooth, round inner surface. A drum core first layer substance is poured into the mold cavity and allowed to harden before the mold rotation is stopped. The mold layer is removed from the mold cavity, a metallic sleeve is placed over the mold shaft to serve as a central hole for the drum core, and the cavity between the drum core first layer and the metallic sleeve is packed with a drum core second layer substance. The drum core second layer substance hardens, and the drum core is removed from the mold cavity.

To form the surface substance on the preformed core, the preformed cylindrical drum core is placed in a cylindrical mold which may be the same or different from the mold used to form the core. This mold is rotated around an axially central mold shaft, and a measured, quantity of the flowable substance is poured into the mold cavity to form a mold layer as discussed above. A surface substance is inserted into the mold cavity between the outer surface of the drum core and the inner surface of the mold layer to fill the space therebetween and is allowed to harden onto the outer surface of the drum core. Finally, rotation of the mold is stopped and the drum core is removed from the mold cavity.

These methods form a rotatable recording drum for use in erasable optical recording having an outer surface substance which is an activated epoxy and an inner core layer formed of microspheres within an epoxy. The drum may also include an outer core layer disposed between the inner core layer and the outer surface. The outer core layer is a mixture of epoxy and ceramic microspheres. Alternatively, the inner core layer could be a mixture of epoxy and glass or ceramic microspheres.

The liquid mold system has several advantages over a solid mold system. First, the finished part will not stick to the mold surface, and the mold need not have any taper to facilitate removal of the finished part. Second, the mold is not damaged by scratching or adhesion during casting. Third, the mold shell can be used to apply more than one layer to the drum section without having to remake the mold, since the inner diameter of the layer can be varied by changing the amount of liquid added to the mold shell in each casting operation. Finally, in liquid molding systems the smoothness and cleanliness of the cast surfaces are determined almost entirely by the purity of the mold liquid, rather than by the cleanliness of a solid mold surface. Methods of purifying liquids are simpler than comparably effective methods of cleaning solid surfaces.

BRIEF DESCRIPTION OF THE DRAWINGS

FIG. 3A shows the mold shell spinning after the liquid mold layer and surface layer have been deposited. In FIG. 3B, the outer core layer has been deposited. In FIG. 3C, the mold shell rotation has been stopped, and the center sleeve and inner core are in place.

FIGS. 6A and 6B are cross-sectional views of the mold shell during operation before and after reorienting the axis of rotation.

FIG. 7 is a cross-sectional view of a solid mold system with a prefabricated core in place, just prior to beginning the injection of the casting resin to form a surface layer.

DETAILED DESCRIPTION OF PREFERRED EMBODIMENTS

Figure 1A:
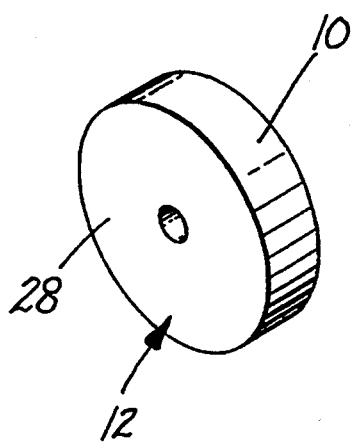
FIG. 1A is a perspective view of a single drum section.
Figure 1B:
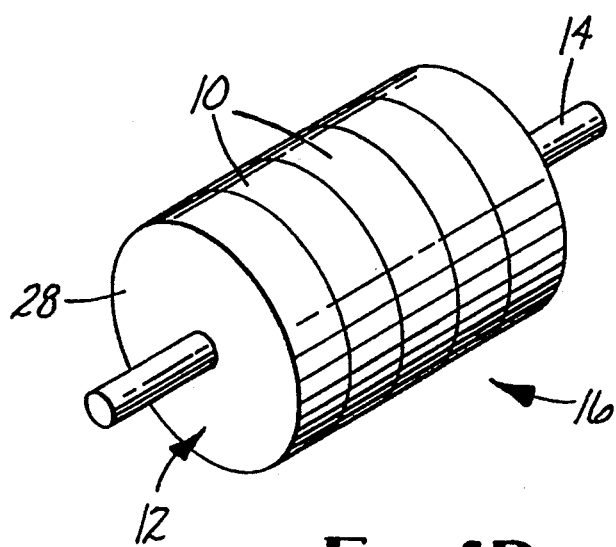
FIG. 1B is a perspective view of several drum sections assembled onto a shaft to form a complete drum.
Figure 1C:
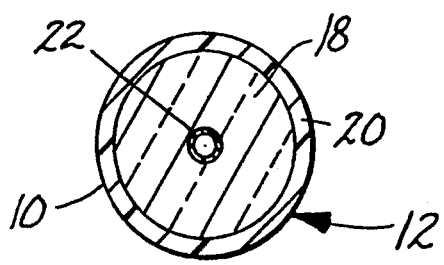
FIGS. 1C and 1D are cross-sectional views of core constructions of the drum sections.
Figure 1D:
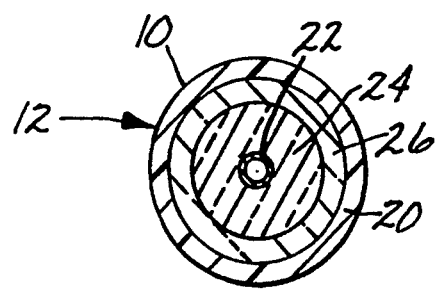

The apparatus and method of the present invention produce cylindrical surfaces which exhibit low runout during rotation, and which produce sufficiently smooth surfaces suitable as optical recording substrates. The surfaces produced are located on the curved peripheral surfaces 10 of drum sections 12 shown in FIG. 1A. The drum sections 12 can be mounted side-by-side coaxially on a shaft 14 to form a drum 16 usable as a rotating drum memory, as shown in FIG. 1B. As shown in FIG. 1C, the drum sections 12 include a core 18 and a substrate or surface layer 20. Additionally, the core 18 may include two or more layers, as shown in FIG. 1D in which the core 18 includes a central sleeve 22, an inner core 24, and an outer core 26. Fabrication of cores 18 from non-metallic materials reduces cost, weight, and the susceptibility of the core 18 to magnetic fields.

Drum sections 12 may have protrusions or indentations (not shown) on the flat side faces 28 which mate with corresponding parts on adjacent drum sections 12 to link together and facilitate cementing drum sections 12 together into a drum 16 during use. Alternatively, linking the drum sections 12 may be accomplished by adhesive. Using separate drum sections 12 simplifies fabrication, and permits adding or removing drum sections 12 on a shaft, to change the capacity of the rotating drum memory.

MOLD SHELL APPARATUS

Figure 2:
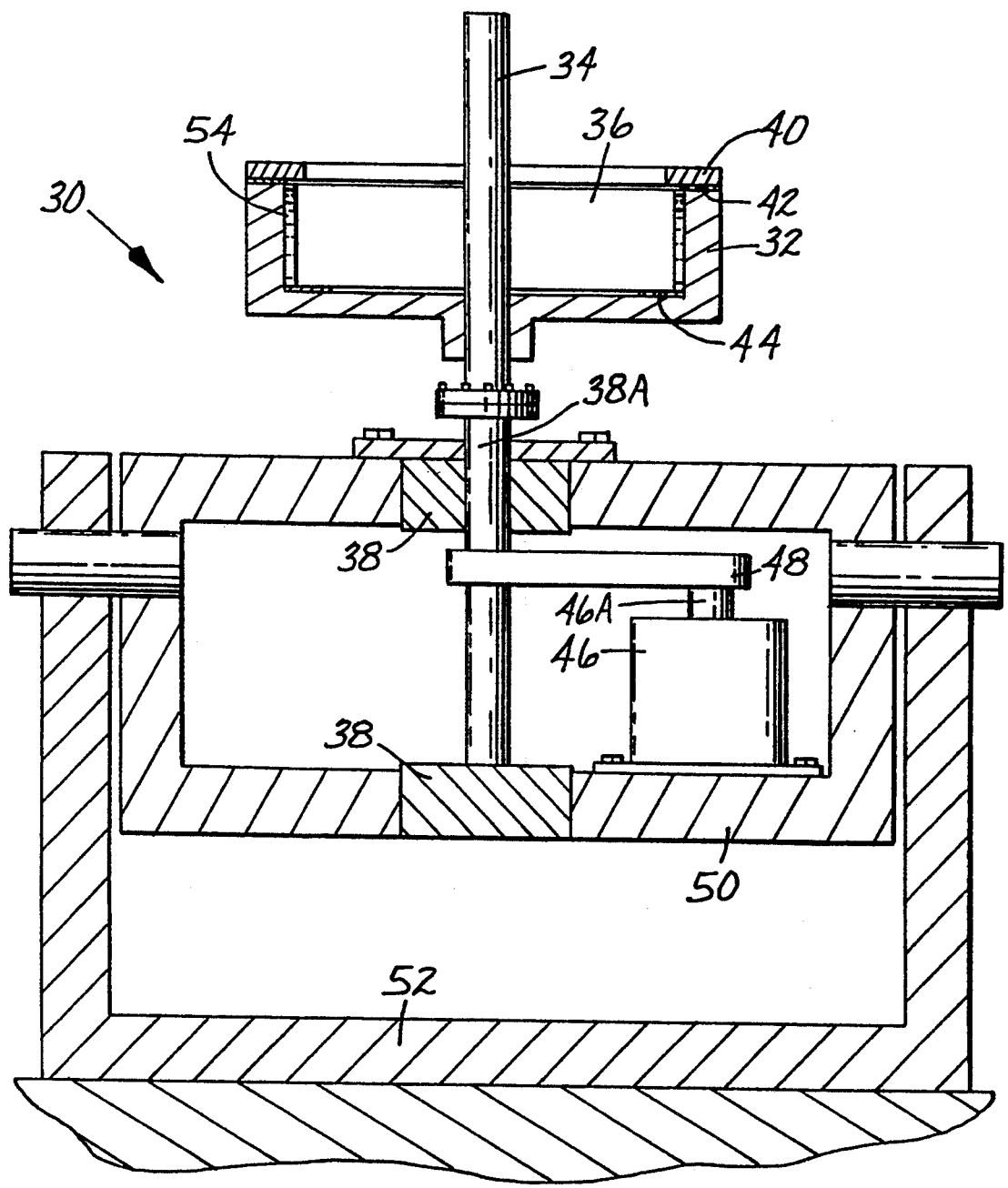
FIG. 2 is a cross-sectional view of a mold shell apparatus.

The methods of fabrication of drum sections 12 use the mold shell apparatus 30 shown in FIG. 2, which can fabricate drum cores 18 and complete drum sections 12 using various different materials. The basic apparatus 30 includes a cylindrical mold having an outer mold shell 32 rigidly and coaxially mounted to a rotatable shaft 34. The mold shell 32 may be machined from a dimensionally stable material such as aluminum. Because the mold shell 32 is spun at rotational velocities above 3000 RPM, the density of the mold shell material should be low, to reduce weight and minimize the effects of any residual unbalance. The mold shell 32 also should be sufficiently strong to resist deformation by the centrifugal forces arising from spinning.

In some cases, such as when photocurable resins are cast, part or all of the mold shell 32 may be made from materials transparent to light, such as ultraviolet light, which is used for curing. Polymeric materials are particularly suitable for their transparency and ease of fabrication. Additionally, a variety of plastic tooling compounds, particularly epoxies, can be used to cast part or all of the mold shell 32. Polymeric materials used for the mold shell 32 must be dimensionally stable, to prevent dimensional changes during use because of warping, heat relaxation, or other uncontrolled phenomena.

The portion of the shaft 34 which lies within the cavity 36 of the mold shell 32, the critical dimension region, must exhibit a very low level of runout when the shaft 34 rotates and should closely approximate a perfect cylinder. This critical dimension region of the shaft 34 should locate the geometrical center of produced drum sections 12 within 12.7 micrometers (0.0005 inches) of the rotational axis of the rotating drum memory shaft used with the drum section, and the shaft 34 diameter should correspond to the diameter of the rotating drum memory shaft. The shaft 34 must be large enough to resist bending during use, while small enough to reduce weight and expense, and improve dimensional accuracy. Shaft 34 may be hollow.

The rotatable shaft 34 is supported on bearings 38 to fix its axis of rotation. Gas lubricated bearings, such as air bearings which provide less than 0.051 micrometers (2 microinches) of runout, are preferred when the apparatus is well balanced. Non-rotational movement could occur in journal bearings if bearing clearances are too large, or in ball or roller bearings if the bearings' centers of rotation are not coincident with the center of the shaft 34. Additionally, ball and roller bearings are less desirable because they produce high frequency vibrations.

The upper edge of the mold shell 32 is covered by a removable annular retaining ring 40. The retaining ring 40 provides an inner lip over the top of the mold shell 32 to prevent liquid from spinning out of the shell 32, while leaving open the majority of the top of the mold shell 32. This is accomplished because the inner diameter of the retaining ring 40 is always smaller than the inner diameter of the liquid in the mold shell 32. The liquid is always poured into the mold shell 32 while the mold shell 32 is spinning so centrifugal force holds the liquid against the outer wall of the mold and below the level of the retaining ring 40. The retaining ring 40 may be made of aluminum or stainless steel, or a chemically stable, non-adhesive polymeric material such as polytetrafluoroethylene and can be attached to the mold shell 32 by machine screws.

Figure 5:
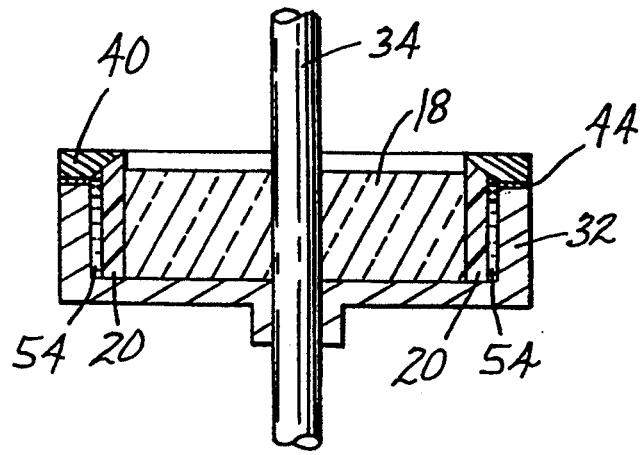
FIG. 5 is a cross-sectional view of the liquid mold system, with prefabricated core, the liquid mold layer and the cast surface layer.

An upper gasket 42 is placed between the retaining ring 40 and the mold shell 32 to form a liquid-tight seal. The upper gasket 42 may be a soft material, such as fluoroelastomers or silicone rubber, which is chemically unreactive with and does not adhere to the casting compounds. The upper gasket 42 may be flat, as shown in FIG. 2, or it may be an O-ring residing in an annular groove cut in the top edge of the mold shell 32. The upper gasket 42 may alternatively be a thin coating of sealant applied to the upper edge of the mold shell 32, to the bottom surface of the retaining ring 40, or to both.

Where a preformed inner core 18 is used to make the drum section 12, as shown in FIG. 5, a lower gasket 44 may be placed in the bottom of the mold shell 32. The lower gasket 44 may be formed from an elastomeric material such as fluoroelastomers or silicone rubber. Alternatively, the lower gasket 44 may be an adhesive sealant applied as a thin layer to the bottom of the mold shell 32 capable of releasing any finished parts to be removed from the mold. Beeswax, which can be melted onto the mold shell bottom, and releases when melted at temperatures from 61° C. to 67° C., can be used. A layer of polytetrafluoroethylene also can be used.

A variable speed electric motor 46 is coupled to the shaft 34 through one or more belts 48. The motor 46 is mounted to a support base 50 through rubber mounts and O-ring belts (not shown) and air bearings 38 to prevent the transmission of vibrations to other components. Alternatively, the motor shaft 46A can be connected directly to the end of the air bearing shaft 38A of the air bearings 38.

The orientation of the axis of shaft 34 of the mold shell apparatus 30 can be varied, as discussed below, via a gimbal mount 52 shown in FIG. 2. The mold shell can be held in the desired position by mechanical stops, locking worm gears, or pinion mechanisms (not shown).

Once the mold shell apparatus 30 has been balanced, it can be used to produce a cylindrical mold which is coaxial with the axis of rotation of the shaft 34 and which has virtually smooth, perfect interior wall surfaces. The mold shell 32 is rotated by the motor 46 at a speed which produces a centrifugal force at the inner surface of the mold shell 32 of about 1800 times the force of gravity, 1800 g. The speed required to achieve this force depends upon the inner radius r of the mold shell 32, and can be derived from the well known relationship $$Z = r\omega^2/g \quad (1)$$

where Z is the ratio of centrifugal force to gravitational force, $\omega$ is the angular velocity in radians per second, and g is the acceleration due to the earth's gravity. Thus, in revolutions per minute (RPM), $$\omega(RPM) = 9.549[gZ/r]^{\frac{1}{2}} \quad (2)$$

When the shaft is rotated at speeds such that Z is above 1000, a small amount of liquid placed in the mold shell 32, with the shaft 34 oriented vertically will form a substantially vertical thin layer lining the inner wall of the mold shell 32. As the centrifugal force is hundreds of times greater than the gravitational force, the thin liquid layer forms a smooth surface, which is critical to the operation of the mold shell apparatus 30. However, the gravitational force causes the inner free surface of the layer to deviate from vertical and be perpendicular to the resultant of the centrifugal and gravitational force vectors. The shape of this free surface is a paraboloid of revolution with an axis coincident with the axis of rotation of shaft 34 and has the equation:

$$y = \omega^2 x^2/2g \quad (3)$$

where y is measured along the axis of rotation, and x is the location of the point under consideration. Solving equation 3 for x and taking the derivative, and noting that because the layer is quite thin in comparison with radius of the mold shell 32, x can be approximated by r, yields:

$$dx/dy = g/[\omega^2 r] \quad (4)$$

where dx/dy is the rate at which the radius of the inner surface of the thin layer changes along the axial direction of the mold shell 32. The rate of change in diameter of the inner surface of the thin layer, commonly referred to as the taper, is 2dx/dy, and is inversely proportional to the square of angular velocity $\omega$. The taper, as well as the high degree of smoothness and concentricity of the free surface of the thin liquid layer, are the features most desired in molds suitable for use in making drum sections for optical drum memories.

The mold shell apparatus 30 described above can be used with various novel methods to form optical recording drums. In the preferred embodiment, the drums are formed using a single liquid mold as described below. Alternatively, the core 18 and the surface layer 20 can be formed separately, and a solid mold system also can be used.

THE DRUM CORE MATERIALS

The drum can include a core and an outer surface on which reading and writing can be performed. The core is preferably formed of inner and outer layers but can simply be a single layer. The core 18 can be conventionally machined from a flat plate of aluminum or other suitably lightweight, dimensionally stable, durable yet workable metal. The central hole must be precisely machined to achieve low levels of surface wandering when the drum section 12 is placed in a rotating drum memory. However, metal cores 18 are very heavy, expensive to fabricate, may require special balancing operations, and are electrically conductive and subject to the magnetic field effects present in many recording processes. Therefore, dimensionally stable polymeric resins or other nonmetallic materials or composites are preferred. Non-metallic cores are lighter, less prone to thermal expansion, less affected by the magnetic fields which are often a part of the recording process, and less expensive to fabricate. As nonmetallic resin cores 18 may lack dimensional stability if made with known methods, unique methods of fabricating mixtures for nonmetallic cores which meet the requirements for rotating drum memories are described below.

Small hollow glass or ceramic spheres can be used with nonmetallic resins to enhance dimensional stability, improve strength, and reduce weight. Spherical fillers can be added to the resin in larger amounts without unduly increasing the viscosity of the composition. Spherical fillers are available in various sizes and compositions. Spheres having diameters of 200 micrometers or less, known as microspheres, are particularly useful when surface quality is an important consideration, since their small size permits a fine surface texture. Where surface quality is less important, larger macrospheres, which can be a few millimeters in diameter, are easier to handle and lower in cost.

In a composite core using both microspherical and macrospherical fillers as shown in FIG. 1D, the inner core 24 includes macrospherical fillers, and the outer core 26 includes microspherical fillers. This improves the quality of the surface to which the surface layer 20 adheres. Because of the different densities of the layers 24 and 26, their interface should be concentric to the center of rotation of the finished drum section to prevent unbalance of the core.

Suitable resins should have a sufficiently low viscosity to flow into the narrow gap between the core 18 and a mold layer 54, and cure at or near room temperature without producing gas bubbles or other contaminants. Also, the cured resin should adhere to the core 18 but not to the metallized mold surface, and should not shrink excessively during cure. It is desirable that the casting resin be of microelectronic grade. Finally, the casting resin, when cured, should be capable of forming a substrate suitable for the optical recording medium to be used for the rotating drum memory.

LIQUID MOLD SYSTEM WITHOUT PREFABRICATED CORE

Figure 3A:
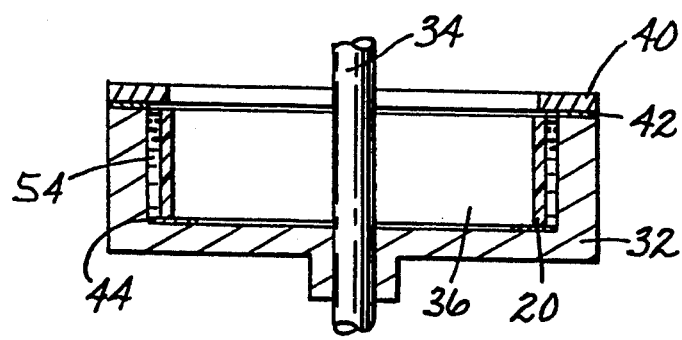
FIGS. 3A-3C are cross-sectional views showing the steps taken in fabricating a drum section without a pre-fabricated core.

Fabrication of drum sections is preferably accomplished by casting the drum section 12 in layers, starting from the surface layer 20 and working inwardly, as illustrated in FIG. 3. This is done using a liquid mold system in which a liquid mold layer 54 is formed in the mold shell 32 to serve as the mold surface. Liquid mold systems are better than molding within a machined surface because the molded material cannot adhere to the liquid surface, and because the molded surface replicates the smooth inner surface of the liquid.

The empty mold shell 32 and the inside of the pouring lip, retaining ring 40, can be coated with a light coating of beeswax to seal the retaining ring 40 to the mold shell 32 and to serve as a thermally excited coating which releases the finished drum when the mold shell 32 is heated.

The first step in forming a drum section 12 is to place the mold shell apparatus 30, with retaining ring 40 in place, in a vibration free environment. Next, the empty mold shell 32 is rotated around a vertical axis. When the required rotation speed is reached, a measured quantity of mold liquid is deposited into the mold shell 32, where it forms mold layer 54 against the inner surface of the mold shell 32. The axis of the shaft 34 may be horizontal to eliminate any wedge shape of the free surface of the mold layer 54 due to the effects of gravity and to form a more optically perfect drum section 12.

The mold liquid forming the mold layer 54 must be of a density significantly higher than the casting resin used to form the surface layer 20, and should be chemically inert with respect to, and immiscible with, the material forming the surface layer 20. A suitable liquid is a fluorocarbon of the type commonly used in many electronic manufacturing processes, which is available in specific gravities over 1.8. The preferred material is a fluorocarbon, Type FC-5311, manufactured by ISC Chemicals, Limited, U.K. It has a specific gravity of 2.08. The chemical description of the material is phenanthrene, tetracosafluorotetradecahydro-(cas 306-91-2). Since many casting materials suitable for the surface layer 20 have specific gravities below 1.1, they will float on the inner surface of the fluorocarbon fluid under the effects of centrifugal force and will float on top under the influence of gravity. Also, fluorocarbon liquids are chemically stable and do not interfere with curing or react with the casting materials. Additionally, due to their chemical stability, fluorocarbon liquids are reusable after filtration, using filters having submicron pore sizes, or other purification. For example, centrifugation eliminates light impurities which migrate to the interface between the layer 54 and the surface layer 20 during casting.

The mold liquid should not contain contaminants which are of lower density than the liquid itself, since the centrifugal force of the spinning mold shell 32 would cause these particles to move to the inner surface of the mold layer 54 and produce defects in the surface of the surface layer 20. Furthermore, the mold liquid should not contain dissolved impurities which would leave an undesirable film on the cast surface. As fluorocarbon liquids are poor solvents, it is unlikely that they will dissolve any materials which might later be deposited as films when the fluorocarbon evaporates.

Once the mold layer 54 is formed in the mold shell 32, a layer of liquid casting material, such as liquid casting resin, such as an activated epoxy, is deposited onto the free surface of the layer 54 to form the surface layer 20 having a thickness of about 2.5 mm (0.1 inch). The rotational speed of the mold shell 32 is maintained until the casting resin cures and hardens. This surface layer 20 forms the outside surface of the drum section 12. Preferably, the resin is placed in a vacuum prior to pouring to extract any air that was entrapped during mixing as large bubbles could affect the surface profile of the resin.

Materials suitable for use as casting resins include acrylics, polyesters, and epoxies. The primary requirements for the casting resins are that they cure at or near room temperature, that they do not shrink excessively or undergo dimensional changes during curing, and that they form optically smooth, durable surfaces suitable for optical or magneto-optic recording materials. Moreover, it is highly desirable that the cured casting resin adhere well to the core 18. Cure times could be reduced by using a resin system curable by ultraviolet light. This would require that the mold shell 32 and the layer 54 be transparent to ultraviolet light.

Figure 3B:
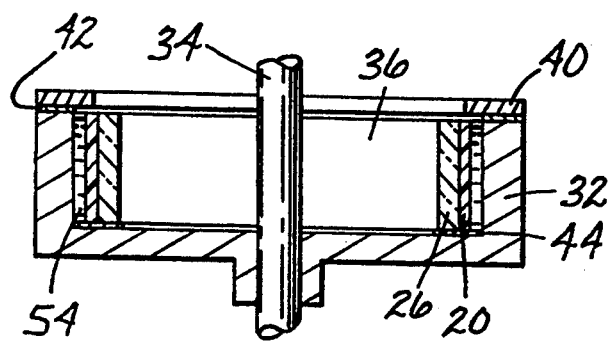

Because the surface layer 20 is thin, delicate, and easily deformed, a second support layer or outer core 26, shown in FIG. 3B, is applied onto the inner surface of the hardened surface layer 20, without stopping rotation. The material used for layer 26 is chosen primarily for strength and dimensional stability, rather than surface quality or optical properties. A suitable material is a mixture of glass or ceramic microspheres and epoxy having sufficiently low viscosity. This material is poured into the spinning mold and is spread out by centrifugal force to form a uniform layer 26 covering the surface layer 20. A sufficient amount of epoxy/microsphere mixture is added to give layer 26 a thickness of about 12 mm (0.5 inches).

Figure 3C:
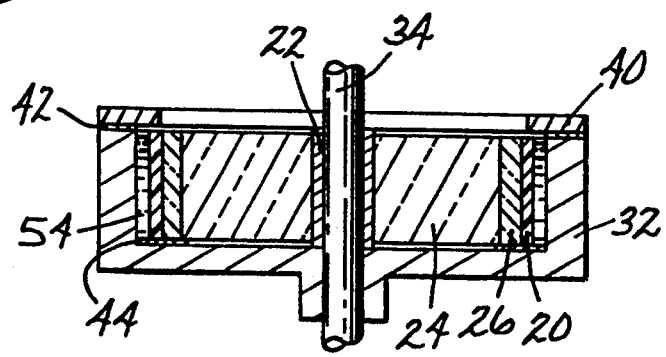

Once the outer core layer 26 has cured, rotation of the mold shell 32 is stopped, and the liquid layer 54 and the retaining ring 40 are removed. A solid, preferably metal, center sleeve 22 is then placed over the shaft 34, as shown in FIG. 3C. The sleeve 22 provides a precise and durable inner diameter for the drum section 12. Therefore, the inner diameter of the sleeve 22 must precisely fit the shaft 34, with substantially zero clearance, but with no interference. The sleeve 22 should be sufficiently thick to provide adequate strength and dimensional stability both during fabrication and during use of the finished drum 16. The length of the sleeve 22 should be equal to the width of the drum section 12. Since the core 24 should adhere well to the sleeve 22, the outer surface of the sleeve 22 may be toughened, primed, or otherwise treated to promote adhesion. In an alternative embodiment, no sleeve 22 is used and the finished drum section 12 is contacted at its axial ends for rotation rather than being placed on a shaft 14.

The final step in casting the drum section 12 is to form the inner core 24. Suitable compositions for forming the core layers 24 and 26 include a binder resin, such as an epoxy and hardener blend, and a hollow spherical filler particulate. The core 24 preferably includes a paste formed of a mixture of activated epoxy and hollow glass or ceramic spheres. Ceramic spheres are preferred to glass spheres as the ceramic spheres are comparatively inexpensive, lightweight, and strong. A suitable epoxy blend can be prepared by combining 35 parts of a modified cycloaliphatic amine hardener with 100 parts by weight of a low viscosity, non-crystallizing bisphenol A epoxy. A suitable macrosphere-filled inner core layer 24 can be prepared by adding 600 milliliters of the epoxy blend to 4000 milliliters of ceramic spheres having diameters in the range of about 0.6–1.4 mm and stirring until a uniform dispersion is obtained. A coarser grade of ceramic spheres having particle diameters in the range of 1.4–2.8 mm results in a coarser surface texture. Despite the high proportion of filler in relation to the amount of epoxy resin used, the resin readily wets the filler particles and the resulting mixture exhibits flow properties which are very satisfactory for casting purposes.

Although the same binder resin can be used for both layers 24 and 26, the outer core layer 26 requires a smoother, finer textured surface over which the final surface is placed. Thus, microspherical fillers, rather than macrospherical fillers are used for layer 26. A suitable composition can be prepared by preparing a batch of the epoxy blend discussed above, and adding hollow glass microspheres until the viscosity approaches the maximum suitable for casting. It is important that the filled epoxy blend spreads evenly when deposited in the spinning mold.

The layer 24 is formed by filling the mold cavity between the sleeve 22 and layer 26 with the paste, leveling the top surface, and removing the excess material. As the paste cures, it bonds to the sleeve 22 and forms the body of the drum section 12. The finished drum section 12 can then be removed from the mold by overturning the mold shell 32, and allowing it to slide down the shaft 34. Where beeswax is used, the mold shell 32 is heated to melt the beeswax to remove the drum section 12. Any excess casting material can be removed from the drum section 12 by conventional machining, while preventing damage to or contamination of the curved surface 10 of the drum section 12. Additionally, excess epoxy connects the drum section 12 to the retaining ring 40 to help remove the section from the mold shell 32. To further assist removal, a tool with compressible O-rings (not shown) can be used to create an interference fit with the drum section 12 and pull it out of the mold shell 32.

The resulting drum section 12 can be cleaned by standard cleaning methods. As the fluorocarbons evaporate without leaving significant residue, special cleaning procedures are not necessary. Next, an optical recording material, such as a magneto-optic medium, can be applied by known vapor deposition methods such as vacuum coating. Typical materials include those suitable for magneto-optic recording, such as combinations of cobalt, chromium, rare earth metals, or other magneto-optic thin film metallic layers used in magneto-optic recording disks. Alternative recording materials include those capable of phase change during recording.

A protective layer can be provided over the recording medium layer to protect it from mechanical damage and corrosion, and reduce the disruptive effects of dust or other contaminants. Thicker overcoat layers, called dust defocusing layers, reduce optical reading noise due to dust since the light beam used for reading has a very small depth of focus. Therefore, any dust on the overcoat surface will be outside the focal plane of the beam, and will contribute less to the noise level. Materials useful as overcoats are optically transparent and mechanically durable. However, overcoating materials which are cured by UV light are usable if the mold shell 32 and the layer 54 are transparent to the required wavelengths. "Hard coat" plastics, such as the hard materials coated over eyeglasses, are desirable and would be hardened by exposure to UV light through the mold shell 32 and layer 54.

Where recording is magneto-optic, the overcoat preferably is not birefringent to the plane polarized light used to read the data. Overcoating resins which do not develop large strains upon curing, as might occur in casting resins which exhibit high shrink rates, are less likely to produce birefringence.

The overcoat can be applied with the molding apparatus used to apply the recording substrate to the drum section. After the optical recording material has been applied, the drum section 12 is placed in the mold shell 32, and the retaining ring 40 is attached. Rotation is started as before, and when a suitable, reduced speed (e.g., 450 rpm) is reached, a measured quantity of mold liquid which forms layer 54 is deposited onto the top of the rotating core 18. The mold liquid is flung outwardly, caught by the ring 40, and directed downwardly along the inner wall of the mold shell 32. The quantity of mold liquid used is less than that used for casting the surface layer 20, as the inner surface of the layer 54 is farther from the core 18, due to the thickness of the surface layer 20 already applied.

Once the mold liquid is in place, the overcoat layer is applied. Again, the rotational speed is increased, and the mold is slowly rotated into the horizontal position as curing occurs. Finally, the drum section 12 is removed from the mold, and any excess edge material is removed. This is a particularly convenient point at which to perform final machining or other finishing operations, since the dust defocusing layer will protect the recording surface from any contaminants resulting from such operations. Once the final finishing is done, the drum section 12 is ready to be mounted on a drum shaft, perhaps with other drum sections, to form a rotating drum memory.

FABRICATION OF CORES

Alternatively, the drum core 18 can be preformed, and the surface layer 20 formed around the core 18 in a mold apparatus 30. This allows the core-forming and surface-forming operations to be performed in parallel. Depending upon the material used for the core 18 and the intermediate layers, several drum section configurations can be produced.

In forming the core 18, after the retaining ring 40 is in place, the mold shell 32 is rotated at the required speed, and a measured quantity of the mold liquid is deposited into the spinning mold shell 32 to form a mold layer 54. Next, the outer core 26 is formed by depositing a quantity of the casting epoxy resin containing hollow microspheres into the rotating mold. As the density of the microspheres are less than the epoxy resin, the outer surface of this outer core layer is higher in epoxy content, and is smoother than the inner portion of the layer. Once the epoxy/microsphere layer has cured, rotation is stopped, the retaining ring 40 is removed, the center sleeve 22 is positioned on shaft 34, and the inner core 24 can be cast.

The inner core 24 is formed by filling the remaining volume of the mold with the epoxy and hollow ceramic macrosphere mixture described above. The top surface is leveled and smoothed, and the inner core 24 is allowed to cure. The core 18 is removed from the mold, and finishing operations are performed.

In order to keep the weight, inertia, and cost of prefabricated cores 18 low, the core material must combine light weight with strength and it must be low cost. Ceramic spheres, such as those manufactured in 1990 by 3M under the trade name Macrolite TM, meet these requirements. When wetted with epoxy resin and allowed to cure in a solid state, the ceramic spheres produce a lightweight solid that is hard and has high tensile strength to resist high centrifugal forces encountered in rapidly spinning drum applications. This material is low in cost.

Alternatively, prefabricated drum cores 18 can be formed as a single layer by pressing the paste-like substance, produced by wetting the ceramic spheres with epoxy, into a cylindrical cavity without using centrifugal force. The cavity can be a mold shell 32, having dimensions identical to the desired size of the finished core. A metallic sleeve 22 is slipped over the shaft 34 prior to inserting the ceramic spheres, and the sleeve 22 becomes the central structural member of the drum section 12 used for mounting the core 18 and for locating the core 18 during subsequent drum section 12 fabrication processes and in final mounting in optical recording systems. The epoxy which wets the ceramic spheres also cements the metal sleeve 22 to the ceramic sphere core. This simple process, however, produces drum sections 12 which are very porous at the perimeter, and which therefore provide poor surfaces on which to coat optical layers by the spinning processes described above. Also, voids can be created in the interior mass of the cores 18 which can cause the drum sections 12 to be unbalanced when rotated in subsequent fabrication processes and in use as optical drums.

Both of these problems are eliminated by using a core mold which is spun at several hundred rpm for a short time after the wetted ceramic sphere material is placed inside the mold, and which is then rotated at approximately 30 rpm until the epoxy hardens. This mold differs from those described above in that rather than using a retaining ring 40, a rigid flat end wall 58 is attached to the mold shell 32 to close the mold cavity. The core material is inserted into the mold cavity of the mold shell 32 before the flat end wall 58 is attached across the upper opening of the mold shell 32. The initial fast spin of the mold causes the epoxy under centrifugal force to migrate through the ceramic spheres to the perimeter of the mold, producing an epoxy-rich, solid layer at the perimeter of the core 18. This effect eliminates the problem of porosity of the core 18 since the rapid spin also causes the ceramic spheres to be flung outwardly from the center of the mold, increasing the density of the ceramic spheres and closing any voids that may exist. Once these effects have been accomplished by the fast spin, the rotation speed of the mold is reduced to prevent further migration of epoxy to the perimeter, but slow speed rotation is maintained to prevent gravity from causing epoxy to run to the bottom as would happen in a stationary mold.

Figure 4:
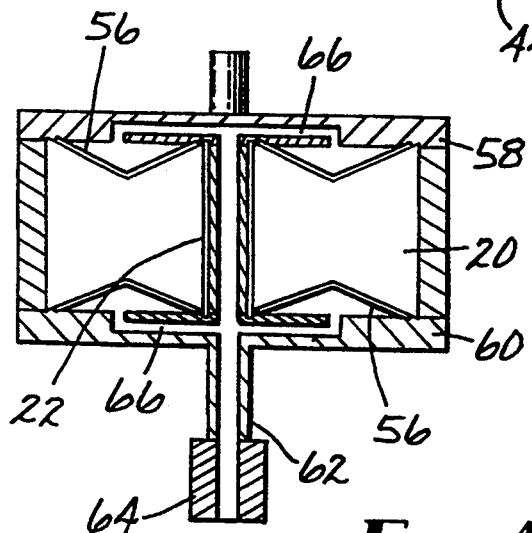
FIG. 4 is a cross-sectional view of the mold shell with air bladders.

However, centrifuging the epoxy and the ceramic spheres to the perimeter of the mold creates a void between the ceramic spheres and the sleeve 22 at the center of the mold. A mechanism which takes up this void includes silicone rubber bladders 56 mounted on the flat end walls 58, 60 of the mold shell 32, as shown in FIG. 4. Because the flat end plates 58, 60 close the mold shell 32 and prevent more core material from being added, the bladders 56 are expanded to take up the volume of material lost by the compacting of the drum core material and give the cured core 18 an indented shape on both edges. After the mold shell 32 is closed, the bladders 56 are expanded inwardly by compressed air or another gas transported to the mold shell 32 by a hollow shaft 62 and a rotary air coupling 64, as shown in FIG. 4. Air passageways 66 are formed in the flat end walls 58, 60 and communicate between the bladders 56 and the hollow shaft 62. The expanded bladders 56 compress the ceramic spheres into a solid mass, and force the mass back into contact with the center sleeve 22 of the mold. The bladders 56 leave concave depressions on both sides of the finished core 18, but these depressions only reduce the mass of the cores 18, and insure that drum sections 12 fit together without interference when multiple drum sections 12 are mounted side-by-side on a common shaft. This is because the depressions insure that the core material does not project beyond an ideal plane surface and cause interference between adjacent drum sections 12. The two sides of the cores 18 are maintained symmetrical by using stiff rubber bladders 56 that require considerable air pressure to inflate. This stiffness ensures that the bladders 56 inflate equally, and since the wetted ceramic spheres offer little resistance to the bladder 56, the sides of the cores 18 become symmetrical.

LIQUID MOLD SYSTEM WITH PREFABRICATED CORE

After the core 18 is fabricated, the surface layer 20 is formed on the core 18 using the liquid mold system in a separate mold apparatus 30 as shown in FIG. 5. A prefabricated solid core 18 is inserted into the mold shell 32, before the mold layer 54 is formed, by removing the retaining ring 40 and placing the core 18 over the shaft 34 and into the mold shell 32 until it rests on the lower gasket 44. It is preferred that the mold shell 32 have an inside diameter approximately 6 mm (0.24 inches) larger than the desired diameter of the finished drum section 12, and the outer diameter of the core 18 be a few millimeters smaller than the diameter of the inner surface of the layer 54. The surface of the core 18 can be toughened by machining or grinding to enhance adhesion of the epoxy. Adhesion promotion is especially important for drums that will operate at high rotational speeds.

Next, the retaining ring 40 and upper gasket 42 are replaced and secured to the mold shell 32, so that the gasket 42 seals against the drum section 12, and the gasket 44 is compressed by the core 18. The bottom of the drum section is sealed by the gasket 44 at the bottom of the mold shell 32 all of the way around the drum section 12 perimeter. After the core 18 and retaining ring 40 are in place, rotation of the mold shell 32 begins. The rotational speed is initially relatively low, suitable for the initial steps of casting. This prevents deposition of the casting resin from unbalancing the apparatus 30, disrupting the interface between the mold liquid and the casting resin, and reducing the quality of drum section surface 10. A starting speed of 450 RPM has been found suitable.

Referring now to FIG. 6 as well as FIG. 5, when the desired speed is reached, the mold liquid which forms layer 54 is poured into the mold shell 32. This is accomplished by pouring the liquid into an annular groove 68 at the inside diameter of the retaining ring 40. The liquid passes through several small holes 70 spaced around the inside surface of the ring 40 into the space between the core 18 and the mold shell 32. The quantity of mold liquid that is used establishes a desired average radius of the inner free surface from the center of rotation of the mold shell 32. This radius also becomes the outer radius of the surface layer 20 when the drum section 12 is completed.

An activated resin is then poured into a second annular groove 72 in the retaining ring 40. The resin then flows through a separate set of small holes 74 spaced around the inside surface of the ring 40 and located on a shorter radius than the first set of holes 70. The resin fills the space between the free surface of the layer 54 and the core 18, and it contacts and adheres to the surface of the core 18. An excess of both the mold liquid and resin are poured into the retaining ring 40 grooves 68, 72 so that the materials rise to levels having smaller radii than the corresponding layers, as shown in FIG. 6. The radii at which the levels stabilize depends upon the ratio of the densities of the two liquids. The excess liquids within the retaining ring grooves 68, 72 serve as reservoirs which replenish liquids which are lost due to evaporation and to shrinkage of the resin as the resin cures during mold shell 32 rotation. The grooves 68, 72 and holes 70, 74 of the retaining ring 40 are necessary for the insertion of liquids into the mold shell 32 when a preformed core 18 is used as the core 18 blocks access to the outer diameter portion of the mold shell cavity.

The mold layer 54 and the surface substance 20 are poured into the mold shell 32 with the shaft 34 axis preferably oriented approximately 30° from horizontal, a 60° tilt. The mold shell 32 is preferably fixed in this orientation to simplify the apparatus and obviate the need to pivot or tilt the mold shell 32. This mold shell 32 orientation, shown in FIG. 6B, substantially eliminates any wedge shape, shown in FIG. 6A, which is otherwise created due to the force of gravity acting on and enlarging the lower portion of the mold layer 54. Additionally, as the amount of wedging is influenced by the rotational speed of the mold shell 32, higher rotational speeds further reduce wedging. While tilting the mold shell 32 to place the axis of the shaft 34 horizontal completely eliminates the wedge shape, the resulting wedge using a 30° tilt is less than 0.025 mm (0.001 in), well within the limits which can be handled by a focus servo of the recording system.

A horizontal axis for the shaft 34 is not used as it presents air entrapment problems. Insertion of the liquids into the space between the mold shell 32 and the core 18 must displace air so that air bubbles are not trapped between the surface layer 20 and the core 18. If the mold shell 32 axis were horizontal, there would be no escape path for the air bubbles as the surface layer 20 material would move vertically with a flat surface to entrap air. Bubbles are not entrapped when the axis of rotation of the mold shell 32 is not horizontal. The 30° tilt, combined with the initial 450 rpm rotational speed, creates the wedge shape in the liquid mold layer 54 and provides a relative angle between the core 18 and the free surface of the mold layer 54. Resin inserted into the space between the mold layer 54 and the core 18 rises with uniform thickness to meet the core 18. It meets the core 18 first at the closed end of the mold shell 32, causing air between the resin and the core 18 to move toward and through the small space between the core 18 and the retaining ring 40.

Once the volume of space between the mold shell 32 and the core 18 has been filled, the mold shaft axis is returned to a vertical position, shown in FIG. 6A, if the mold shell 32 is pivotable, and any remaining wedge shape of layers 20 and 54 gives way to layers of uniform thickness across the width of the core. The rotational speed of the mold shell 32 is now increased to increase the centrifugal force on both layers so that the resin cures under high pressure in contact with the mold layer 54 and the core 18. Shrinkage of the resin is compensated for by the addition of resin from the reservoir contained in the retaining ring 40.

After the surface layer 20 has cured, rotation can be stopped. Due to the high viscosity of the epoxy and because the entire volume between the core 18 and the mold shell 32 is filled, wave motion caused by vibration is negligible. Any mold layer 54 liquid that spills out of the mold shell 32 is caught in a shallow tray (not shown) located beneath the mold shell 32. Once rotation has stopped, the retaining ring 40 is removed, and the finished drum section 12 is removed from the mold. Since the mold surface is liquid, the drum section 12 will not stick to or damage the mold surface. Where beeswax is used, the drum section 12 can be removed from the mold 32 end surface by heating it sufficiently to melt the beeswax at the bottom and then turning the mold upside down and allowing the drum section 12 to slide down the shaft 34.

AS slight overfilling of the mold during casting assures complete coverage of the core 18 by the surface layer 20, some excess material may be present at the edges of the finished part. This material can be removed by machining, as long as damage to the curved peripheral surface 10 is prevented. Once final edge finishing of the drum section 12 is complete, the recording material can be applied to the surface 10 of the surface layer 20. An overcoat is applied, and edge finishing is performed as described above.

SOLID MOLD SYSTEM WITH PREFABRICATED CORE

Alternatively, when forming a surface layer 20 for a drum section 12, the mold layer 54 can be formed using a hardenable casting epoxy or prepolymer composition, called the mold resin. Although this method is not as simple as using a liquid mold system and requires more steps, it represents an improvement over known prior art systems. In this system, the liquid mold resin is deposited into a spinning mold shell 32 and is allowed to cure while maintaining the rotational speed, thereby forming a solid tapered cylindrical mold layer 54 having a shape described by equation 4.

Commercially available casting epoxies which have a very low shrink level during curing and do not contain volatile solvents or produce reaction products which bubble or form other surface defects are suitable mold resin materials for layer 54. Epoxies adhere well to clean metals and other durable materials, even without adhesion promoting primers, and are curable at temperatures near room temperature. Additionally, some epoxies provide a very brittle, optically polishable surface. Because of the need for high surface smoothness, the liquid materials used to form the mold and the drum surface layer 20 should not contain particulate impurities of any significant size. This can be achieved by filtering using filters having pore sizes in the submicron size range. Liquid materials having this level of purity are microelectronic grade materials. A particularly suitable mold resin is a two-part liquid casting epoxy prepared by blending 100 parts by weight of a low viscosity bisphenol a compound with 55 parts by weight of a modified cycloaliphatic amine hardener. The mixed composition is aspirated in a vacuum chamber to remove any air bubbles entrained during mixing, as is common when casting polymeric materials.

The aspirated resin blend is deposited onto the rotating inner wall of the mold shell 32. The speed of the mold shell 32 is held constant at approximately 2500 rpm until the mold resin forming the layer 54 hardens. While the free surface of mold layer 54 will be smooth after curing, it is not yet suitable for use as a mold. After stopping rotation, any protrusions caused by particulate impurities which traveled to the inner surface of the mold layer 54 must be removed by polishing. Also, as many casting resins adhere to, chemically react with, or diffuse into the mold layer 54, the mold layer 54 must be provided with a protective coating. The coating isolates the mold layer 54 from the materials used in casting but does not reduce its smoothness or adversely affect its concentricity or other dimensions. The coating, such as vacuum deposited chromium, also effects a release of the outer surface 20 from the solid mold layer 54 by preventing adhesion of the outer surface 20 to the mold layer 54. Also, wiping a very thin layer of release agent on the mold layer 54 before inserting the surface layer material further prevents adhesion.

The mold resin forms a coating having a thickness causing its surface to be equidistant from the axis of rotation of the mold shell 32 to insure concentricity, flatness, and roundness of the surface. Due to gravity, the lower portion of the surface of mold layer 54 is slightly thicker so that the surface forms a wedge or conical shape. This shape assists the release of the finished drum section 12 from the mold shell 32. A wedge of any taper can be obtained by controlling the rotation speed of the mold shell 32. A difference in the upper and lower radii of approximately 0.1 mm (0.004 in) is acceptable.

When the drum section 12 is to be formed without a prefabricated core 18, fabrication proceeds as described above.

Where a preformed core 18 is used, the retaining ring 40 is removed and the core 18 is placed over the shaft 34 and into the mold, until it rests on the lower gasket 44. The retaining ring 40 and upper gasket 42 are then replaced and secured to the mold shell 32, and the bottom of the drum section 12 is sealed at the bottom of the mold shell 32 all the way around its perimeter as done when using a liquid mold system. Next, the surface layer 20 is formed by filling the gap surrounding the core 18 with casting resin 76.

The casting resin 76 can be injected into the sealed gap between the mold layer 54 and the core 18, using top and bottom openings provided in the gap, as shown in FIG. 7. The top opening is connected to a vacuum source 78 by tube 80 to remove air from the gap. Alternatively, the entire mold may be placed in a vacuum chamber, provided that casting resin 76 remains exposed to the atmosphere, or is pressurized. The bottom opening is connected to a valved tube 82, which is immersed in casting resin 76 in a container 84. The casting resin 76 is allowed to flow into the gap until it begins to exit from the top opening, whereupon the openings are closed, and the casting resin 76 in the gap is allowed to cure.

Once the casting resin 76 has cured, the retaining ring 40 is removed, and the core 18 with a cast surface layer 20 around its outer periphery is removed from the mold. The brittle resin in the inlet and outlet tubes 80, 82 is easily broken off during removal of the finished drum section 12. Removal is simplified if the drum section 12 is provided with grasping means to pull it out, or if a set of ejector pins (not shown) pushes out the drum section 12 from the mold shell 32. The lower gasket 44 can be compressed during the sealing of the retaining ring 40, and the release of this compression may be sufficient to release the drum section 12 from the mold. Additionally, the taper or wedging in the mold layer 54, which can be controlled by controlling the centrifugal force according to the equations discussed above, increases the physical clearance between the mold layer 54 and the drum section 12 as the parts separate to insure that neither surface is damaged. Thus, in this situation, wedging is beneficial. The drum section 12 is then slid from the shaft 34 by turning the mold upside down. These drum sections 12 may require slight edge finishing, especially at the entrance and exit holes. Finishing can be accomplished by conventional machining, as described above. Finally, a magneto-optic recording layer can be deposited onto the surface of the drum section 12. A protective overcoat layer may also be applied using the same molding techniques.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, differently-sized molds, operating at different speeds may be used to form smaller or larger drum sections.

We claim:

1. A cylindrical rotatable optical recording drum for use in erasable optical recording comprising:
   an outer cylindrical surface on which reading and writing can be performed; and
   a core including an inner core layer comprising hollow spheres mixed with a resin, wherein the radially outer surface of the inner core layer has a higher ratio of resin to spheres than the radially inner surface of the inner core layer.

2. A cylindrical rotatable optical recording drum for use in erasable optical recording comprising:
   an outer cylindrical surface on which reading and writing can be performed; and
   a core including an inner core layer comprising hollow spheres mixed with a resin and an outer core layer disposed between the inner core layer and the outer cylindrical surface, wherein the outer core layer comprises hollow spheres mixed with a resin, and wherein the radially outer surface of the outer core layer has a higher ratio of resin to spheres than the radially inner surface of the outer core layer.

* * * * *